United States Patent Office 3,379,453
Patented Apr. 23, 1968

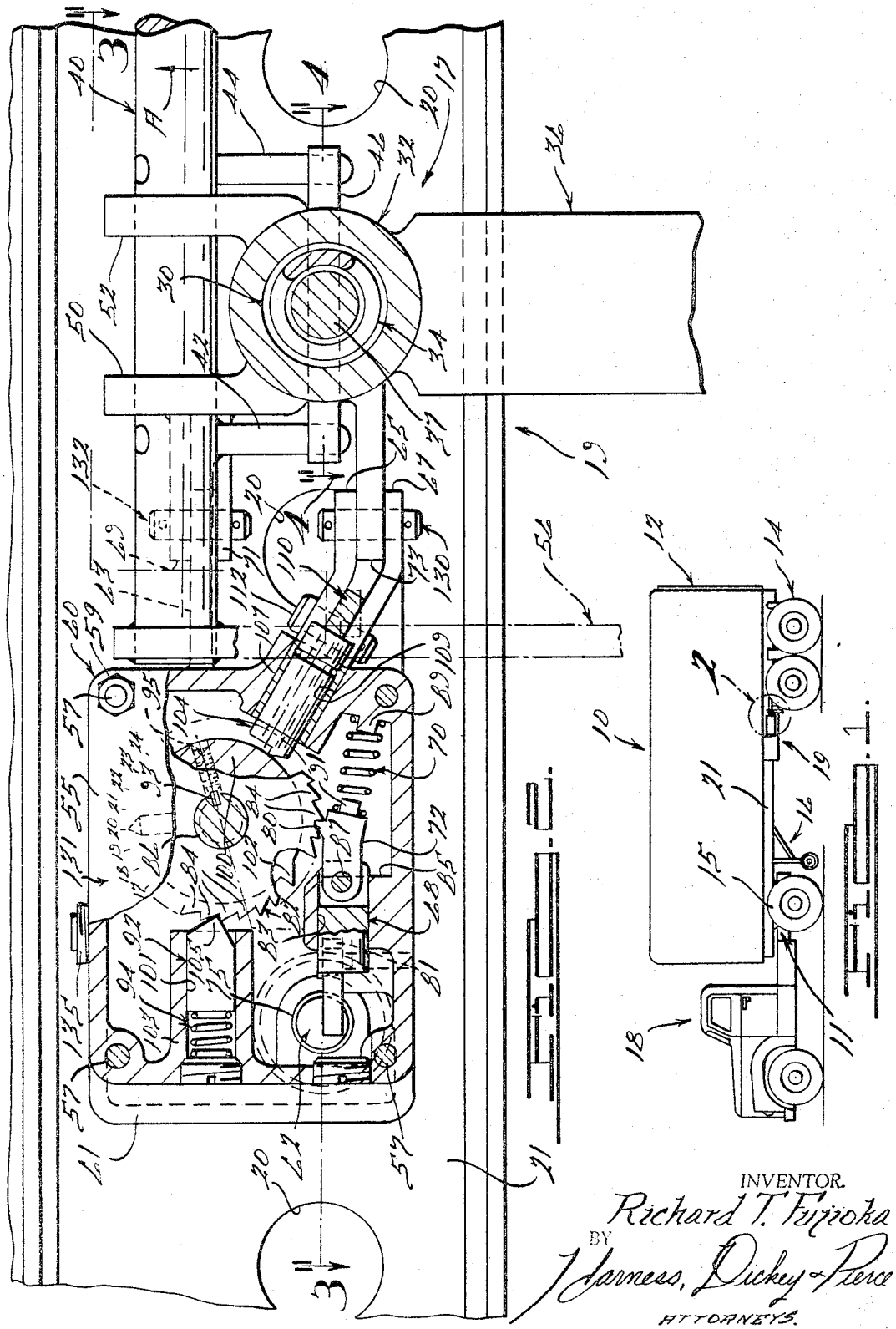

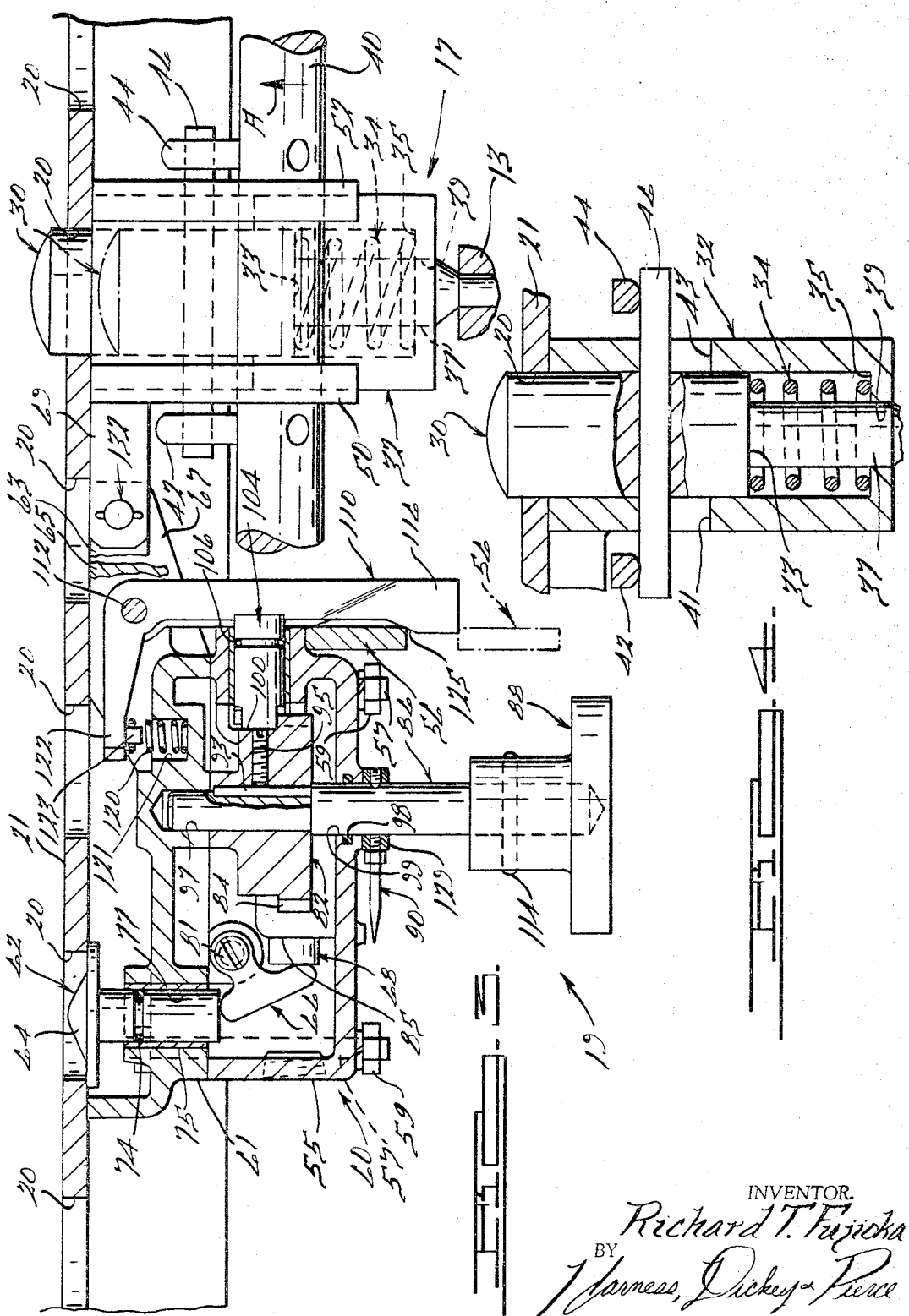

3,379,453
SYSTEM FOR INDEXING WHEEL BOGIES TO RAILS OF HEAVY-DUTY OVER-THE-ROAD SEMITRAILERS
Richard T. Fujioka, Oxford, Mich., assignor to Fruehauf Corporation, Detroit, Mich., a corporation of Michigan
Filed July 5, 1966, Ser. No. 562,834
10 Claims. (Cl. 280—81)

ABSTRACT OF THE DISCLOSURE

The disclosure relates to heavy-duty, over-the-road semitrailers and more particularly to a unique system for adjustably positioning a wheel suspension relative to a trailer body that is carried entirely by the wheel suspension.

Broadly described, the present invention includes an adjusting device carried by a wheel bogie suspension unit and movable longitudinally relative to a rail fixed relative to a trailer body, said adjusting device comprising a locking mechanism having a movable pin cooperable with spaced openings in said rail for locking said wheel bogie in selected positions along said rail, means biasing said pin toward said openings, latch means for holding said pin out of locking relation with said openings, means for moving said latch means out of holding relation with said pin including an indexing mechanism movable with said locking mechanism along said rail, said indexing mechanism having a rotatable wheel, detent means cooperable with said spaced openings and adapted to effect rotation of said wheel, means movable in response to a predetermined angular position of said wheel and operatively engageable with said latch means whereby to withdraw said latch means and release said pin upon preselected movement of said adjusting device along said rail.

---

In order to comply with differing state and local vehicle regulations, it is often necessary to redistribute the weight apportioned to the tractor wheels and the trailer wheel bogie suspension unit of heavy-duty, over-the-road semitrailers. Conventionally, wheel bogie suspension units are adjusted longitudinally of the trailer body to effect this weight redistribution, the suspension unit being moved closer to or further away from the tractor wheels to distribute more or less weight, respectively, to the suspension unit.

Among the features desirable in these adjustable constructions is that they be adapted for use with standard or existing trailer body constructions and require a minimum of trailer structural modification. Also, it is desirable that adjustment of the wheel bogie suspension unit can be made with comparative ease and preferably by the vehicle operator alone. Furthermore, the adjustable suspension unit should be capable of effective use irrespective of relatively wide tolerance variations in the trailer body since the latter is not held to close tolerance during manufacture and, in addition, is subject to hard usage which can bend or otherwise distort portions of the trailer body.

Accordingly, an important object of the present invention is an improved self-contained, versatile adjusting device for indexing and locking a wheel suspension unit to a trailer body.

Further objects of the present invention are an improved adjusting device of the above character by which the vehicle operator alone can index and lock the wheel suspension unit and which is effective independently of relatively wide tolerance variations in the trailer body.

Additional objects include a device of the above character which is relatively inexpensive to manufacture, rugged in construction and reliable in use.

Further objects and advantages of the present invention will become more apparent from a consideration of the following detailed description and claims taken in conjunction with the drawings in which:

FIGURE 1 is a side elevational view of a heavy-duty, over-the-road vehicle embodying the present invention;

FIG. 2 is an enlarged view, partly in section, illustrating the structure within the circle 2 of FIG. 1;

FIG. 3 is a sectional view taken substantially along the line 3—3 of FIG. 2; and FIG. 4 is a cross-sectional view taken substantially along the line 4—4 of FIG. 2.

Referring now more specifically to the drawings a heavy-duty, over-the-road vehicle embodying the present invention is seen in FIG. 1 to include a trailer 10 having a trailer body 12 provided with a conventional wheel bogie suspension 14 and landing gear 16 and secured to a tractor 18 by a fifth wheel 11. Tractor wheels 15 support one end of the trailer 10 and the wheel bogie suspension unit 14 supports the other end. However, the wheeel bogie suspension unit 14 is adjustable longitudinally of the trailer body 12 to redistribute the weight borne thereby and by the tractor wheels 15. For example, antifriction rollers (not shown) may be provided on the suspension unit 14 and a complementary guide rail (not shown) may be provided on the trailer body 12 as is illustrated and described in U.S. Patent No. 3,085,816, granted April 16, 1963, to K. W. Tantlinger et al. and owned by the assignee of the present invention. Thus, in this example, the rail seats on the rollers and permits free longitudinal movement of the suspension unit 14 relative to the trailer body 12.

A novel adjusting device 19 embodying the present invention connects the wheel bogie suspension unit 14 to the trailer body 12 at selected longitudinal positions relative thereto. In use, the trailer 10 and cargo weight is borne by the suspension unit 14 and by the tractor wheels 15 so that by adjusting and properly positioning the wheel bogie suspension unit 14 along the trailer body 12, the desired weight distribution to the tractor wheels and the suspension unit can be achieved.

Turning now to FIGS. 2 and 3, the adjusting device 19 is seen to be positioned adjacent a lower rail 21 which forms a part of the trailer body 12 and extends longitudinally thereof. The adjusting device 19 includes a locking mechanism 17 having a cylinder 32 which movably carries a pin 30 adapted to be received in selected openings 20 formed along the length of the lower rail 21. An arm 36 is fixed to the cylinder 32 as by welding and is also fixed in a suitable fashion to the wheel bogie suspension unit 14. Thus, the wheel bogie suspension unit 14 is secured in a desired position along the trailer body 12 by locating the pin 30 in an appropriate one of the openings 20 in the lower rail 21. However, to adjust the wheel bogie suspension unit 14, the pin 30 is withdrawn from the rail openings 20, the adjusting device 19 repositioned along the rail 21 and the pin 30 inserted into another opening 20. Longitudinal adjustment between the suspension unit 14 and the trailer body 12 is effected by setting the brakes to the wheels of the suspension unit 14, withdrawing the pin 30 and thereafter moving the trailer 10 under the power of the tractor 18.

The pin 30 is normally biased toward the lower rail 21 under the force of a compression spring 34 which is caged between a radial shoulder 33 on the pin 30 and an end wall 35 on the cylinder 32. A reduced diameter extension 37 on the pin 30 extends through the spring 34 to maintain its integrity and through an opening 39 in the cylinder end wall 35 and may have a handle or other suitable means 13 secured thereto to permit manual pin manipulation. A transverse bar 46 extends diametrically through the pin 30 and outwardly through openings 41, 43 in the cylinder 32 to limit movement of the pin 30 toward the rail 21 under the force of the spring 34 as shown in FIG. 3

A control shaft 40 is journaled in a pair of bearing brackets 50, 52 which are integral with or are otherwise suitably secured to the cylinder 32. A pair of fingers 42, 44 depend from the control shaft 40 and are adapted to engage behind the transverse bar 46. An operating lever 56 is fixed, as by welding, to one end of the control shaft 40 so that by moving the lever 56 to turn the control shaft 40 in the direction of the arrow A shown in FIGS. 2 and 3, the fingers 42, 44 move the transverse bar 46 and the pin 30 in a downward direction as seen in FIGS. 3 and 4 and withdraw the pin 30 from the rail opening 20. When the lever 56 is released, the force of the spring 34 biases the pin 30 back toward the rail 21 and into one of the openings 20 aligned therewith.

According to the present invention, the adjusting device 19 further includes an indexing mechanism indicated generally at 60 in FIGS. 2 and 3. The indexing mechanism 60 comprises a housing 61 having a cover 55 secured thereto by bolts 57 and nuts 59 and positioned adjacent the rail 21 and connected to the locking mechanism 17 for movement therewith along the rail 21. Thus, the housing 61 has an upper, laterally projecting ear 63 and a lower pair of parallel, generally laterally projecting ears 65, 67, suitably fixed thereto or integral therewith. An upper pair of parallel, spaced, laterally projecting ears 69, 71 are fixed to the bearing bracket 50 and sandwich the projecting ear 63 on the housing 61. A lower, laterally projecting ear 73 fixed to the cylinder 32 is sandwiched between the pair of ears 65, 67 as seen in FIG. 2. A pair of vertically aligned pins 130, 132 extend through openings in the sandwiched ears 65, 67, 73 and 63, 69, 71, respectively, to interconnect the housing 60 and the cylinder 32 while permitting pivotal movement therebetween about an axis passing through the pins 130, 132.

As shown best in FIG. 3, a detent or plunger 63 is slidably disposed in a sleeve bushing 75 which is pressed into an opening 77 in the housing 61. The plunger 62 carries an annular seal 74 which engages the bushing 75 and the plunger has an enlarged conical nose portion 64 at one end adapted to be received in the rail openings 20. A relatively large radial flange 79 behind the conical nose portion 64 prevents the plunger 62 from passing completely through the openings 20 and the nose taper permits the plunger 62 to move easily out of the openings 20 as the indexing mechanism moves along the rail 21.

The other end of the plunger 62 is engaged by a generally T-shaped link 66 which is pivotally mounted on the housing 61 by a screw 81. The link 66 also engages one end of a plunger 68 which is slidably disposed in an opening 83 formed in an internal projection 85 of the housing 61. The plunger 68 is biased toward the left as seen in FIGS. 2 and 3 by a helical compression spring 70 caged between the housing 61 and one end of an articulated link 72 pivoted at its other end by a pin 87 to the plunger 68. The compression spring 70 encompasses projections 89, 91 on the housing 61 and the link 72, respectively, to hold the spring in place.

The articulated link 72 has a laterally projecting tooth 80 positioned to engage circumferentially spaced teeth 84 on a wheel 82 which is secured for conjoint rotation with a shaft 86 by a key 93 held in place by a set screw 95. The shaft 86 is supported at one end in a recess 97 in the housing 61 while its other end is supported in and extends through an opening 99 in the housing cover 55 for a purpose to be described. An annular seal 98 is positioned in the opening 99 and engages the shaft 86.

In use, as the indexing mechanism 60 moves along the trailer body rail 21, the plunger nose portion 64 moves into and out of successive ones of the rail openings 20 and causes the plunger 62 to reciprocate within the bushing 75. This plunger movement swings the link 66 back and forth about the screw 81 thereby reciprocating the plunger 68 and the articulated link 72.

As the articulated link 72 moves toward the right, as seen in FIG. 2, engagement between the tooth 80 and one of the teeth 84 on the wheel 82 causes the wheel to turn in a counterclockwise direction as seen in FIG. 2. An anti-back-up plunger 92 is supported in an opening 101 in a boss 103 and has a toothed end 105 biased by a spring 94 into engagement with the teeth 84 on the wheel 82. The toothed end 105 of the plunger 92 is shaped to prevent clockwise turning movement of the wheel 82 so that when the link 72 moves back to the left, the tooth 80 ratchets over the wheel teeth 84. Thus, the wheel 82 is indexed one tooth 84 each time the plunger 68 and articulated link 72 reciprocate.

The wheel 82 has a reduced diameter cylindrical hub 100 offset axially from the teeth 84. The hub 100 has one tooth 102 formed thereon adapted to engage a toothed end of still another reciprocating plunger 104. As shown in FIGS. 2 and 3, the plunger 104 is slidably disposed in a bushing 107 pressed into an opening 109 in the housing 61 and carries an annular seal 106 which engages the bushing 107 and has its outer end extending outwardly beyond the bushing 107.

A generally L-shaped latch 110 is pivotally mounted at its vertex by a pin 112 between an inner portion of the ears 65, 67 which are integral with or welded to the housing 61. The latch 110 has one leg 116 positioned to engage the outer end of the plunger 104 and another leg 122 engaged by one end of a compression spring 120, the other end of which is seated in a recess 121 in the housing 61. The spring 120 is held in place on the latch leg 122 by a projection 123 and biases the latch 110 in a clockwise direction about the pivot pin 112, as seen in FIG. 3, thereby holding the plunger 104 against the wheel hub 100.

The outer end of the latch leg 116 is positioned to engage the lever 56 and when the lever 56 is in the position illustrated by dot-dash lines in FIG. 3, the pin 30 is in a withdrawn position from the rail openings 20 as is also shown by dot-dash lines in the figure. When the latch 110 is swung in a counterclockwise direction about the pivot 112, the latch leg 116 moves away from the lever 56 whereupon the pin 30 moves into one of the rail openings under the force of the compression spring 34 and the lever 56 is carried into engagement with the housing cover 55 as seen in FIG. 3. Counterclockwise pivoting movement of the latch 110 is effected by movement of the plunger 104 to the right, as seen in FIGS. 2 and 3, when the tooth 102 on the wheel hub 100 moves into engagement with the plunger 104.

In use, the lever 56 and pin 30 normally are positioned as shown in full lines in FIG. 3 and the wheel bogie suspension unit 14 is locked relative to the trailer body 12. When it is desired to reposition the wheel bogie suspension unit 14 along the trailer body 12, the lever 56 is pivoted in a downward direction as seen in FIG. 3, to the position shown by dot-dash lines. The latch leg 116 may have a tapered cam surface 125 to facilitate easy movement of the lever 56 therepast. At this point, the spring 120 swings the latch 110 back to the position illustrated holding the lever 56 in this downward position and the pin 30 withdrawn from the opening 20.

The trailer body 12 and wheel bogie suspension unit 14 are then moved relative to each other as by setting the bogie wheel brakes and driving the tractor 18 which is attached to the trailer 10. As the trailer body 12 moves, the rail 21 also moves longitudinally relative to the adjusting device 19 causing the rail openings 20 to move past the plunger 62. As each opening 20 moves past the conical nose 64, the plunger 62 moves out and in and reciprocates the plunger 68, causing the wheel 82 to index one tooth in a counterclockwise direction as seen in FIG. 2. When eventually the tooth 102 on the wheel hub 100 reaches the plunger 104, the plunger 104 moves toward the right, as seen in FIGS. 2 and 3, to swing the latch 110 in a counterclockwise direction as seen in FIG. 3, whereupon the lever 56 is released and the pin 30 moves into one of the rail openings 20 to again lock the wheel bogie suspension unit 14 to the trailer body 12.

Manifestly, the spacing between centers of the pin 30 and the plunger 62 substantially equals the spacing between centers of a whole number of rail openings 20 and it will be seen that by properly angularly positioning the hub tooth 102 relative to the plunger 104 at the outset of the adjusting sequence, the wheel bogie suspension unit 14 will automatically relock when the suspension unit 14 and the trailer body 12 have moved a preselected distance or number of rail openings 20 relative to each other. To this end, the wheel 82 may be preset manually to position the hub tooth 102 at predetermined angular positions relative to the plunger 104.

As shown in FIG. 3, the shaft 86 carries a hand wheel 88 at its outer end, the shaft and hand wheel being secured together by a diametrical screw 114. A pointer 90 also is fixed to the shaft 86, for example, by extending through the shaft 86, and is secured thereto by nuts 129. The pointer 90 is adapted to register with indicia 131 on the face of the housing cover 55 as seen in FIG. 2. The indicia 131 and the pointer 90 are so related to the wheel teeth 84 and the tooth 102 that by setting the pointer 90 to a selected numbered setting on the indicia 131 and latching the lever 56 behind the latch 110, one will know exactly how many rail openings 20 the plunger 62 need move past before the pin 30 is released and the wheel bogie suspension unit 14 again locked to the rail 21.

For example, it is known that the wheel 82 indexes one tooth 84 each time the conical nose 64 passes one of the rail openings 20. To adjust the wheel bogie suspension unit a distance of twenty openings 20, the pointer 90 is set to "20" on the indicia 131 which indicates that the tooth 102 is displaced an arcuate distance equal to 20 teeth 84 from the plunger 104. The inclination of the teeth 84 and the teeth 80 and 105 prevents the wheel 82 and therefore the handwheel 88 from turning clockwise; however, both can be turned counterclockwise. After the handwheel setting is made, one need only set the bogie wheel brakes and move the tractor 18 and trailer 10 in the desired direction. When the rail 21 has moved a distance of twenty openings 21 relative to the plunger 62, the wheel 82 will have indexed twenty teeth 84, at which point the tooth 102 will engage and move the plunger 104 as well as the latch 110. The plunger 30 then moves under the force of the spring 34 into the new opening 20 and the wheel bogie suspension unit 14 is again locked to the trailer body 12.

It will be appreciated that no connectors, mounting assemblies or the like are required on the trailer body 12 to accommodate the adjusting device 19 of the present invention. All that is required is to form openings 20 at the desired spacing along the rail 21. The adjusting device 19 is a self-contained unit and is secured directly to the wheel bogie suspension unit 14 and is carried thereby.

Another feature of the present invention resides in the fact that the indexing unit 60 is pivotable about the vertical pins 130, 132. The spring 34 acts to bias the lever 56 in an upward direction, as seen in FIG. 3, which acts on either the latch 110 or the housing cover 55. In either case, the housing 61 is held snugly against the rail 21 to insure proper functioning engagement between the conical nose 64 of the plunger 62 and the rail openings 20. This is so even if the rail 21 becomes somewhat bent or warped during use or is not held to close tolerances during manufacture.

To insure proper functioning of the internal parts of the indexing unit 60, the housing 61 may be kept partly filled with lubricating oil. To this end, the housing 61 may have a removable filler plug 135 through which oil may be delivered.

By the foregoing, there has been disclosed an improved system for adjustably positioning a wheel suspension relative to a trailer body calculated to fulfill the inventive objects set forth, and while a preferred form of the present invention has been illustrated and described above in detail, various additions, substitutions, modifications and omissions may be made thereto without departing from the spirit of the invention as encompassed by the appended claims.

What is claimed is:

1. In a vehicle of the type having a trailer, trailer body and a wheel bogie suspension unit positionable along said trailer body, an adjusting device carried by said suspension unit and movable longitudinally relative to a rail fixed relative to said body, said adjusting device comprising a locking mechanism having a movable pin cooperable with spaced openings in said rail for locking said suspension unit in selected positions along said rail, means biasing said pin toward said openings, latch means for holding said pin out of locking relation with said openings, and means operatively engageable with said latch means to withdraw said latch means and release said pin upon preselected movement of said adjusting device along said rail comprising an indexing mechanism movable with said locking mechanism along said rail, said indexing mechanism having a rotatable wheel; detent means cooperable with said spaced openings and adapted to effect rotation of said wheel, and means movable in response to a predetermined angular position of said wheel to effect release of said latch.

2. An adjusting device as defined in claim 1 wherein said locking mechanism is adapted to be fixed to said suspension unit and guidingly engages said rail, said indexing mechanism being carried by said locking mechanism and movable transversely relative to said rail, and resilient means normally biasing said indexing mechanism toward said rail.

3. An adjusting device as defined in claim 1 wherein said wheel is selectively angularly adjustable.

4. An adjusting device as defined in claim 1 wherein said locking mechanism comprises a cylinder positioned to slidingly engage said rail and carrying said pin, spring means within said cylinder and biasing said pin toward said rail, a bar movable with said pin and extending outwardly of said cylinder, rotatable shaft means having finger means engageable with said bar for withdrawing said pin from said rail openings, lever means fixed to said shaft means and engageable with said latch means.

5. An adjusting device as defined in claim 1 wherein said indexing mechanism comprises a housing pivotally carried by said locking mechanism, said detent means being slidably disposed in said housing and operatively engaging a ratchet means, spring means normally biasing said ratchet means in one direction and said detent means toward said rail, said ratchet means engaging a toothed surface on said wheel, a projection on said wheel spaced from said toothed surface, a plunger slidable in said housing and positioned for engagement with said projection, said latch means comprising an arm pivotally mounted on said housing and engageable with said plunger.

6. An adjusting device as defined in claim 1 which includes spring means normally biasing said arm toward said plunger and said plunger toward said wheel.

7. An adjusting device as defined in claim 4 wherein said indexing mechanism comprises a housing pivotally carried by said locking mechanism, said detent means being slidably disposed in said housing and operatively engaging a ratchet means, spring means normally biasing said ratchet means in one direction and said detent means toward said rail, said ratchet means engaging a toothed surface on said wheel, a projection on said wheel spaced from said toothed surface, a plunger slidable in said housing and positioned for engagement with said projection, said latch means comprising an arm pivotally mounted on said housing and engageable with said plunger and said lever means.

8. An adjusting device as defined in claim 7 wherein said arm is adapted to hold said lever means in one position where said pin is withdrawn from said rail openings, said arm being movable away from said lever means when said projection engages said plunger to release said lever means and said pin.

9. An adjusting device as defined in claim 1 wherein said detent means and said pin are spaced a whole number of rail openings.

10. An adjusting device as defined in claim 3 which includes indicia means on said indexing means for determining the angular position of said wheel.

References Cited

UNITED STATES PATENTS

| | | | |
|---|---|---|---|
| 2,841,411 | 7/1958 | Sheppard et al. | 280—80 |
| 2,900,194 | 8/1959 | De Lay | 280—80 X |
| 3,096,993 | 7/1963 | McKay | 280—81 |
| 3,126,209 | 3/1964 | Jewell et al. | 280—80 X |

RICHARD J. JOHNSON, *Primary Examiner.*

L. D. MORRIS, *Assistant Examiner.*